United States Patent [19]

Iwasa et al.

[11] Patent Number: 5,022,519
[45] Date of Patent: Jun. 11, 1991

[54] FLEXIBLE DISK JACKET

[75] Inventors: Masakazu Iwasa; Kazuhiko Morita; Toshio Kawamata, all of Kanagawa, Japan

[73] Assignee: Fuji Photo Film Co., Ltd., Kanagawa, Japan

[21] Appl. No.: 659,435

[22] Filed: Oct. 10, 1984

[30] Foreign Application Priority Data

Oct. 21, 1983 [JP] Japan ................. 58-197194

[51] Int. Cl.⁵ .............................. B65D 85/30
[52] U.S. Cl. .................... 206/313; 206/444
[58] Field of Search ............ 206/313, 444, 328

[56] References Cited

U.S. PATENT DOCUMENTS 3,774,757 11/1973 Harris et al. ................. 206/313
4,238,030 12/1980 Maylandt ..................... 206/313
4,247,002 1/1981 Horian ....................... 206/313

FOREIGN PATENT DOCUMENTS 71217 6/1977 Japan .......................... 206/313
2023096 12/1979 United Kingdom ............... 206/313

Primary Examiner—Joseph Man-Fu Moy
Attorney, Agent, or Firm—Sixbey, Friedman, Leedom & Ferguson

[57] ABSTRACT

A flexible disk jacket for accommodating therein a disk-like magnetic recording medium to form a flexible disk is formed by folding and bonding a plastic sheet into a bag-like shape. The plastic sheet is of a composite sheet material formed by laminating an outer layer and an inner layer respectively consisting of at least one plastic layer. The outer layer is colored and has heat sealability and heat resistance. The inner layer has heat sealability and antistatic properties.

6 Claims, 1 Drawing Sheet

FLEXIBLE DISK JACKET

BACKGROUND OF THE INVENTION

1. Field of the Invention

This invention relates to a flexible disk jacket for accommodating therein a disk-like magnetic recording medium to form a flexible disk sometimes referred to as a "floppy disk" or "diskette".

2. Description of the Prior Art

As shown in FIG. 1, conventional flexible disks comprise a casing (generally referred to as a "flexible disk jacket") and a disk-like magnetic recording medium 2 accommodated therein for rotation. The flexible disk jacket is formed by folding a plastic sheet 1 such as of polyvinyl chloride (PVC), polycarbonate, polyethylene terephthalate (PET) or the like into a bag-like shape. The recording medium 2 comprises a flexible base sheet which is circular in shape and bears a magnetic recording layer on one side or both sides thereof. To the inner surface of the jacket is attached a liner 3 formed of unwoven fabric, for instance, in order to protect the recording medium 2, reduce rotational torque of the recording medium 2 and clean the surfaces of the same.

When manufacturing the flexible disk jacket, a blank of a predetermined shape is stamped out from a sheet material and then said liner 3 is bonded t the blank by thermolaminating. The resulting laminate is folded, with heat applied to the portions to be bent, and formed into a bag-like shape by heat sealing, ultrasonic sealing or the like.

Therefore, the plastic sheet 1 must have heat sealability. Further, the plastic sheet 1 must be resistant to heat produced when the flexible disk is driven by the recording/reproducing system. The plastic sheet 1 must be dimensionally stable and is preferred to have high scratch resistance.

That is, the plastic sheet 1 must withstand temperatures of up to 80° C. without significant heat deformation or deformation due to heat shrinkage. Further, two parts of the plastic sheet 1 must be heat-sealable together at a temperature between 100° C. and 300° C. with a sufficient bonding strength, and the liner 3 of such as unwoven fabric of rayon/propylene resin or polyester resin must be heat-sealable to the plastic sheet 1 at a temperature in the same range with a sufficient bonding strength.

Conventional flexible disk jackets are generally colored substantially in achromatic color, e.g., black or other dark color. This is because carbon is added to the plastic sheet 1 as an antistatic agent. When the jacket is electrostatically charged, dust is attracted thereto to cause drop-out upon recording or reproduction or to cause the surface of the recording medium 2 to be scratched.

Carbon is advantageous over other antistatic agents in that it can, in small amounts, reduce the electrical resistance of polyvinyl chloride without adversely affecting the properties of the polyvinyl chloride, an inexpensive and easy-to-process material that is widely used for the plastic sheet 1 in producing the jacket. Furthermore carbon itself is inexpensive and stable and does not adversely affect the magnetic recording medium 2.

However, there is a demand for flexible disk jackets colored in various fresh chromatic colors as such flexible disks would be more attractive in appearance and could be easily separated by color. Further, flexible disk jackets of dark color are disadvantageous in that any fingerprints are clearly visible. In order to color the flexible disk jacket in a fresh chromatic color, a colorless or thin white antistatic agent must be used. However, such antistatic agents are apt to exude from the surface of the jacket to be transferred to the surface of the recording medium, thereby adversely affecting the properties and durability of the recording medium, and at the same time the electric resistance of such antistatic agents is apt to change with time depending on the storage conditions.

Further, sometimes, the flexible disk jacket must have light-shielding properties.

In short, there has been developed no plastic sheet material which can satisfy all the requirements for the flexible disk jacket.

SUMMARY OF THE INVENTION

In view of the foregoing observations and description, the primary object of the present invention is to provide an improved structure of the flexible disk jacket which permits the flexible disk jacket to be colored in fresh chromatic color without adversely affecting other various properties of the flexible disk jacket.

Another object of the present invention is to provide an improved structure of the flexible disk jacket which permits the flexible disk jacket to be colored in fresh chromatic color and at the same time permits use of carbon and other dark colored antistatic agents.

In accordance with the present invention, the flexible disk jacket is formed by folding and bonding a composite plastic sheet material comprising an outer layer and an inner layer, the outer layer being colored in chromatic color and having heat sealability and heat resistance, and the inner layer having heat sealability and antistatic properties.

In one preferred embodiment of the present invention, the outer surface of the outer layer is grained so as to resist marking with fingerprints. In another preferred embodiment of the present invention, the inner layer is a plastic sheet containing therein an inorganic antistatic agent.

With the arrangement of the present invention, the various requirements for the flexible disk jacket may be shared between the two layers and therefore can be satisfied relatively easily.

DESCRIPTION OF THE PREFERRED EMBODIMENT

Figure 1:
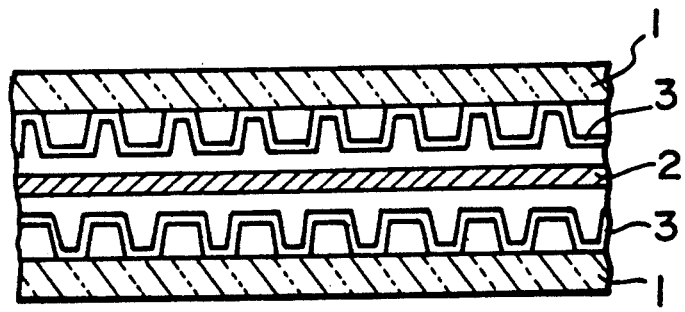
FIG. 1 is a fragmentary cross-sectional view of a flexible disk having a flexible disk jacket in accordance with the prior art.
Figure 2:
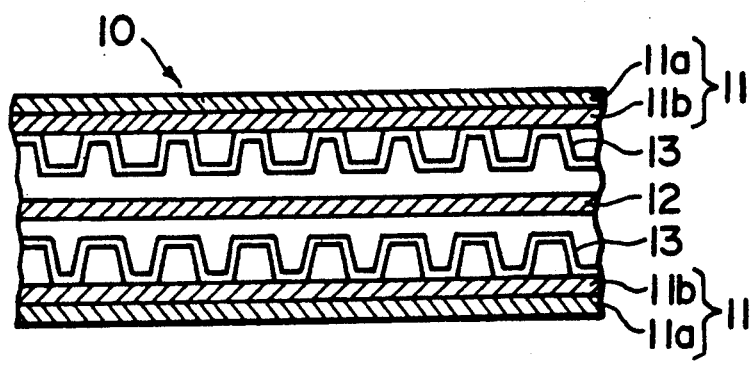
FIG. 2 is a fragmentary cross-sectional view of a flexible disk having a flexible disk jacket in accordance with an embodiment of the present invention.

In FIG. 2, a flexible disk jacket 10 in accordance with an embodiment of the present invention accommodates therein for rotation a disk-like magnetic recording medium 12 comprising a flexible base sheet which is circular in shape and bears a magnetic recording layer on one side or both sides thereof. The flexible disk jacket 10 comprises a bag-like plastic sheet 11 and a liner 13 which is formed of, for instance, unwoven fabric, and is attached to the inner surface of the plastic sheet 11. The plastic sheet 11 is of a composite plastic sheet material formed by laminating an outer layer 11a and an inner layer 11b. The outer layer 11a is colored and has heat sealability and heat resistance. The inner layer 11b has heat sealability and antistatic properties. The outer layer 11a and the inner layer 11b may be respectively of a plurality of plastic layers, if desired. The composite sheet material is folded and sealed along the side edges by heat sealing, ultrasonic sealing or the like into a bag-like shape.

As the basic polymer of the outer layer 11a, various resins such as vinyl chloride homopolymer, vinyl chloride-vinyl acetate copolymer, PET, polycarbonate, polyimide, polyamide, polyester, polystyrene, polyvinylidene chloride, styrene-butadiene copolymer, polyethylene, polypropylene, cellulose acetate, acrylonitrile-styrene-butadiene copolymer and polyvinylidene fluoride can be used.

To the basic polymer are added known additives, stabilizers, and modifiers. For example, when vinyl chloride homopolymer or vinyl chloride-vinyl acetate copolymer is used as the basic polymer, ABS/MBS modifier, octyl tin stabilizer and montan wax additives may be added.

In order to color the outer layer 11a, the following pigments, blended with suitable stabilizers and the like if desired, may be used:

yellow-orange pigments—chrome yellow pigment, zinc yellow, cadmium yellow, Hansa yellow, flavanthrone yellow, benzidine yellow, molybdate orange, yellow oxide, and benzidine orange;

red pigments—red oxide, thioindigo, cadmium red, anthraquinone red, quinacridone red, and chromium tin;

blue-green-violet pigments—phthalocyanine blue, phthalocyanine green, indanthrene blue, chrome oxide green, cobalt green and violet oxide;

white pigments—titanium oxide, zinc oxide, zinc sulfide, and white lead.

In order to prevent the outer surface of the outer layer 11a from being marked with fingerprints, and to improve the scratch resistance of the same, it is preferred that modifier be added to the outer layer 11a and at the same time the outer layer is grained by, for instance, the embossing or sand mat process.

Generally, it is preferred that the basic polymers for the outer layer 11a and the inner layer 11b be the same from the viewpoint of adherence and dimensional stability. However, different basic polymers may be bonded together by coating, lamination, or co-extrusion. The basic polymer and the additives of the outer layer 11a should be carefully selected s that when the composite plastic sheet 11 is folded into a bag-like shape, the folded portion does not craze.

As the resin of the inner layers 11b, there can be used various resins such as vinyl chloride, vinyl chloride-vinyl acetate copolymer, epoxy resin, phenolic resin, acrylic resin, methacrylate resin, urethane resin, phthalate resin, polyester resin, amino resin, and styrene resin. If necessary, plasticizer and stabilizer may be added to the resin. Further, conductive material or antistatic agent is added to the resin. As the conductive material or the antistatic agent, inorganic conductive material or inorganic antistatic agent such as carbon black, graphite, metal powder, SnOx, and TiOx is preferably used. Inorganic conductive material is advantageous over general antistatic agents in that it is stable and does not adversely affect the magnetic recording medium 12. When such inorganic conductive material was dispersed into the resin described above at 1 to 70 wt % and the dispersion was coated on the inner surface of the outer layer 11a to a thickness of 0.1 to 10 $\mu$ and dried to form the inner layer 11b, there was obtained a composite plastic sheet having specific surface resistance of $10^4$ to $10^{10}\Omega/m^2$. This value is sufficient to prevent the flexible disk jacket from being electrostatically charged.

An additive for providing heat sealability may be added to the inner layer 11b. In order to provide light shielding properties, inorganic pigments such as carbon, graphite, titanium oxide and red oxide, or dyes having absorption band in the visible region can be added to the inner layer 11b.

Since, the main purpose of the inner layer 11b is to provide heat sealability and antistatic properties (to reduce electrical resistance) to the flexible disk jacket 10, the inner layer 11b may be thinner than the outer layer 11a so that heat resistance and dimensional stability of the entire jacket 10 are sustained by the outer layer 11a.

The colored outer layer 11a is preferably prevented from being electrostatically charged though this is not essential. Generally it is preferred that the specific surface resistance of the colored outer layer 11a be about $10^8$ to $10^{12}$ $\Omega/m^2$. In order to prevent the colored outer layer 11b from being electrostatically charged, even colorless or thin white antistatic agent may be used since, unlike in conventional flexible disk jackets, the inner layer 11b containing inorganic conductive material or antistatic agent prevents the antistatic agent in the outer layer 11a from being transferred to the recording medium 12 and at the same time, keeps the specific surface resistance of the entire jacket 10 low even if the electric resistance of the antistatic agent in the outer layer 11a changes with time.

Further, the inorganic conductive material or antistatic agent such as carbon, graphite, metal powder or the like has high thermal conductivity and accordingly diffuses heat locally applied to the flexible disk jacket 10, for instance, near the driving motor of the driving system. Recently, driving systems are being made small in size and thickness and therefore heat generated by the driving system is apt to be retained in the driving system. Further, when the flexible disk jacket is subjected to localized heat, it is apt to deformed. The inorganic conductive material in the inner layer 11b contributes to diffusion of heat produced by the driving system and to diffusion of heat locally applied to the jacket 10 from the driving system.

As said liner 13 is used an unwoven fabric formed of rayon/polypropylene, polyester or the like. The liner 13 is generally bonded to the inner surface of the inner layer 11b by thermolaminating. Therefore, the material of the inner layer 11b should be selected so that the liner 13 can be bonded to the inner layer 11b with a sufficient bonding strength.

Now several examples of forming composite plastic sheet 11 by coating a colored plastic sheet (as the outer layer 11a) with resin composition (as the inner layer 11b) will be described.

EXAMPLE 1

| | |
|---|---|
| carbon black (ASAHI #80) | 20 parts by weight |
| styrenated alkyd resin | 32 parts by weight |
| xylol | 65 parts by weight |

The resin compound of the above composition was dispersed for 48 hours in a ball mill and the dispersion thus obtained was applied to one side of a rigid PVC sheet (colored in blue, 250 μm thick, specific surface resistance: $10^{12}\Omega/m^2$) to a thickness of 5 μm. The specific surface resistance of the composite plastic sheet thus obtained was $10^8\Omega/m^2$.

EXAMPLE 2

| | |
|---|---|
| graphite (mean particle size: 0.3 μm) | 15 parts by weight |
| butylated melamine resin | 20 parts by weight |
| xylol | 55 parts by weight |
| MEK | 3 parts by weight |

The resin compound of the above composition was dispersed in a dispersion mill for 1 hour and then in a ball mill for 24 hours and the dispersion thus obtained was applied to a rigid PVC sheet (colored in blue, 250 μm thick, specific surface resistance: $10^{12}\Omega/m^2$) to a thickness of 10 μm. The specific surface resistance of the composite plastic sheet thus obtained was $10^9\Omega/m^2$.

EXAMPLE 3

| | |
|---|---|
| Aluminum flake | 65 parts by weight |
| epoxy resin | 23 parts by weight |
| xylol | 10 parts by weight |
| methyl cellosolve | 20 parts by weight |
| MEK | 3 parts by weight |

The resin compound of the above composition was dispersed for 5 hours by a homomixer and the dispersion thus obtained was applied to one side of a rigid PVC sheet (colored in orange, 250 μm thick, specific surface resistance: $10^{12}\Omega/m^2$) to a thickness of 8 μm. The specific surface resistance of the composite plastic sheet thus obtained was $10^8\Omega/m^2$.

EXAMPLE 4

| | |
|---|---|
| copper oxide (mean particle size: 1 μm) | 40 parts by weight |
| epoxy resin | 23 parts by weight |
| xylol | 10 parts by weight |
| methyl cellosolve | 20 parts by weight |
| MEK | 3 parts by weight |

The resin compound of the above composition was dispersed for 5 hours by a homomixer and the dispersion thus obtained was applied to one side of a rigid PVC sheet (colored in orange, 250 μm thick, specific surface resistance: $10^{12}\Omega/m^2$) to a thickness of 15 μm. The specific surface resistance of the composite plastic sheet thus obtained was $10^7\Omega/m^2$.

EXAMPLE 5

| | |
|---|---|
| AST-1001 (manufactured by Merix Chemical) | 65 parts by weight |
| styrenated alkyd resin | 50 parts by weight |
| xylol | 10 parts by weight |
| MEK | 3 parts by weight |

The resin compound of the above composition was dispersed for two hours in a dispersion mill and the dispersion thus obtained was applied to a rigid PVC sheet (colored in orange, 250 μm thick, specific surface resistance: $10^{12}\Omega/m^2$) to a thickness of 2 μm. The specific surface resistance of the composite plastic sheet thus obtained was $10^9\Omega/m^2$.

EXAMPLE 6

A composite plastic sheet was prepared in the same manner as in Example 5 except that 1 part by weight of GafstatAD-510 (manufactured by GAF Corp.) was used instead of AST-1001. The composite plastic sheet thus obtained had a specific surface resistance of $10^{10}\Omega/m^2$.

EXAMPLE 7

A composite plastic sheet was prepared in the same manner as in Example 5 except that 1 part by weight of NopcostatHS (manufactured by Nopco Chemical) was used instead of AST-1001. The composite plastic sheet thus obtained had a specific surface resistance of $10^{10}\Omega/m^2$.

We claim:

1. A flexible disk jacket for accommodating for rotation a flexible disk formed by folding and bonding a plastic sheet into a bag-like shape, said plastic sheet comprising an outer layer and an inner layer bonded together, said outer and inner layers respectively consisting of at least one plastic layer, said outer layer being colored and having heat sealability and heat resistance properties, and said inner layer having heat sealability and antistatic properties.

2. A flexible disk jacket as defined in claim 1, in which an outer surface of said outer layer is grained.

3. A flexible disk jacket as defined in claim 1 or 2 in which said inner layer comprises a resin layer which is provided over the entire inner surface of said outer layer and contains conductive material.

4. A flexible disk jacket as defined in claim 3, in which said conductive material is inorganic conductive material.

5. A flexible disk jacket as defined in claim 1 and further including a liner attached to an inner surface of said plastic sheet.

6. A flexible disk jacket as defined in claim 5, in which said liner is bonded to an inner surface of said inner layer.

* * * * *